United States Patent [19]
Boese

[11] 3,903,635
[45] Sept. 9, 1975

[54] CONVERTIBLE FISHING REEL
[75] Inventor: Harold L. Boese, Galveston, Tex.
[73] Assignee: H & B Enterprises, Inc., Houston, Tex.
[22] Filed: Feb. 21, 1974
[21] Appl. No.: 444,352

Related U.S. Application Data
[63] Continuation-in-part of Ser. No. 326,397, Jan. 24, 1973, abandoned.

[52] U.S. Cl. ................................ 43/22; 242/84.2 B
[51] Int. Cl. ...................... A01k 87/06; A01k 89/00
[58] Field of Search ........... 242/84.2 B, 84.4; 43/20, 43/22

[56] References Cited
UNITED STATES PATENTS

| | | | |
|---|---|---|---|
| 2,549,029 | 4/1951 | Stalder | 242/84.2 B |
| 2,584,020 | 1/1952 | Humphreys | 43/20 |
| 2,752,717 | 7/1956 | Lind | 242/84.2 B |

FOREIGN PATENTS OR APPLICATIONS

| | | | |
|---|---|---|---|
| 1,157,742 | 12/1957 | France | 242/84.2 B |

Primary Examiner—Louis G. Mancene
Assistant Examiner—Peter K. Skiff
Attorney, Agent, or Firm—Clarence A. O'Brien; Harvey B. Jacobson

[57] ABSTRACT

A convertible fishing reel is provided comprising a rotatable line spool which is mounted for selective movement between a reeling position and a spin casting position. The spool is latched in the reeling position in such a fashion as to accommodate a line leveling action. Toward that end, the reel drive shaft extends through an arcuate slot in the supporting frame to guide as well as limit movement of the reel carrying body between the reeling and spin casting positions.

6 Claims, 6 Drawing Figures

CONVERTIBLE FISHING REEL

This invention relates generally to fishing reels utilized for both reeling and spin casting operations, and the present application is a continuation-in-part of my prior co-pending application Ser. No. 326,397, filed Jan. 24, 1973, now abandoned.

Convertible fishing reel attachments for fishing rods having a winding reel displaceable between two positions for reeling and spin casting operations are already well known as disclosed, for example in U.S. Pat. Nos. 2,512,170, 2,549,029 and 2,634,920. Such convertible fishing reel attachments involve either a complex drive mechanism or one that is not very effective particularly where the drive mechanism is not displaceable with the reel itself between the reeling and spin casting positions. Those convertible fishing reels wherein the drive mechanism is displaceable with the reel between the reeling and spin casting positions are plagued with other problems making conversion from one operation to the other relatively difficult. Also, the latter type of convertible fishing reel mechanism was incapable of accommodating any line leveling action necessary for a smoothly operating fishing reel. It is, therefore, an important object of the present invention to provide a convertible type of fishing reel attachment for fishing rods which avoids the aforementioned drawbacks and disadvantages of prior art arrangements.

In accordance with the present invention a convertible type of fishing reel mechanism is mounted on the fishing rod by means of a cup-shaped frame member having a pair of parallel spaced side walls between which a reel supporting body is pivotally mounted for displacement between reeling and spin casting positions. A drive mechanism for the winding reel is carried by the reel supporting body and its drive shaft which extends through an arcuate slot in one of the side walls of the frame member, both guides and limits the pivotal movement of the reel and support body between the reeling and spin casting positions. The reel supporting body is held in the reeling position by a latch hook mounted on a spring-like extension of the frame member. The latch hook may be withdrawn by depressing a release tab on the spring extension. The spring extension is furthermore elastically deflectable so as to accommodate limited angular movement of the reel supporting body relative to the reeling position for line leveling purposes.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
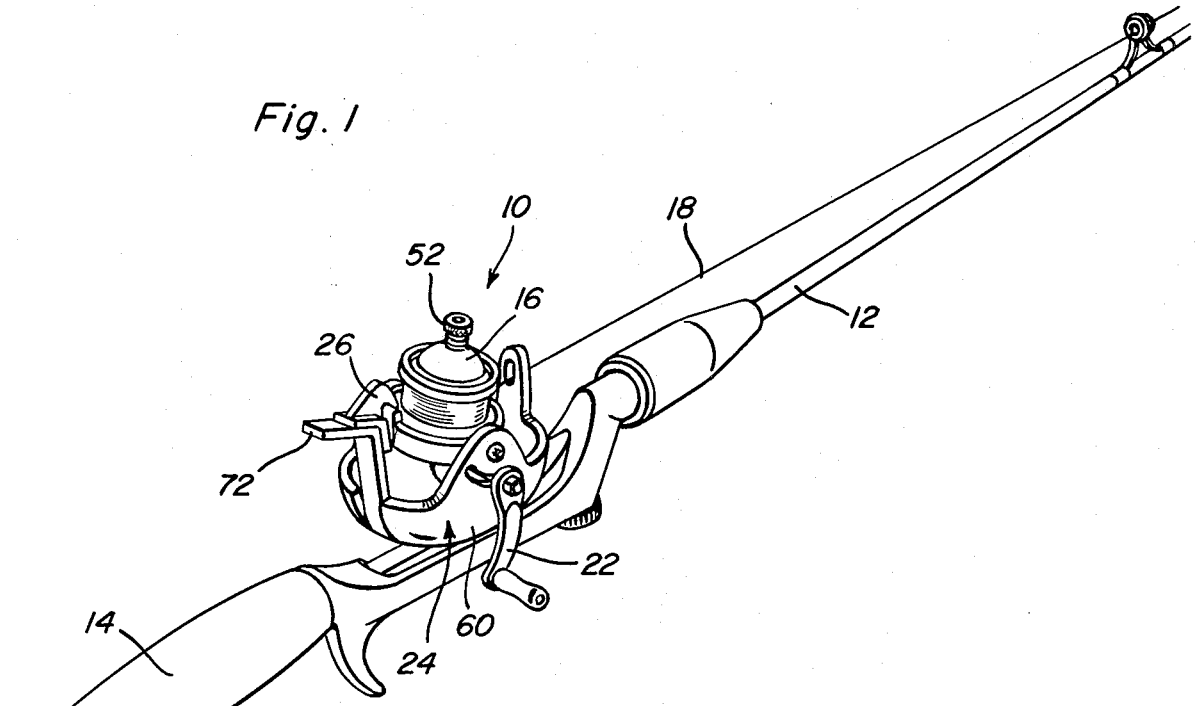
FIG. 1 is a perspective view of the convertible fishing reel of the present invention mounted on a typical fishing rod and illustrated in a position for reeling operation.
Figure 2:
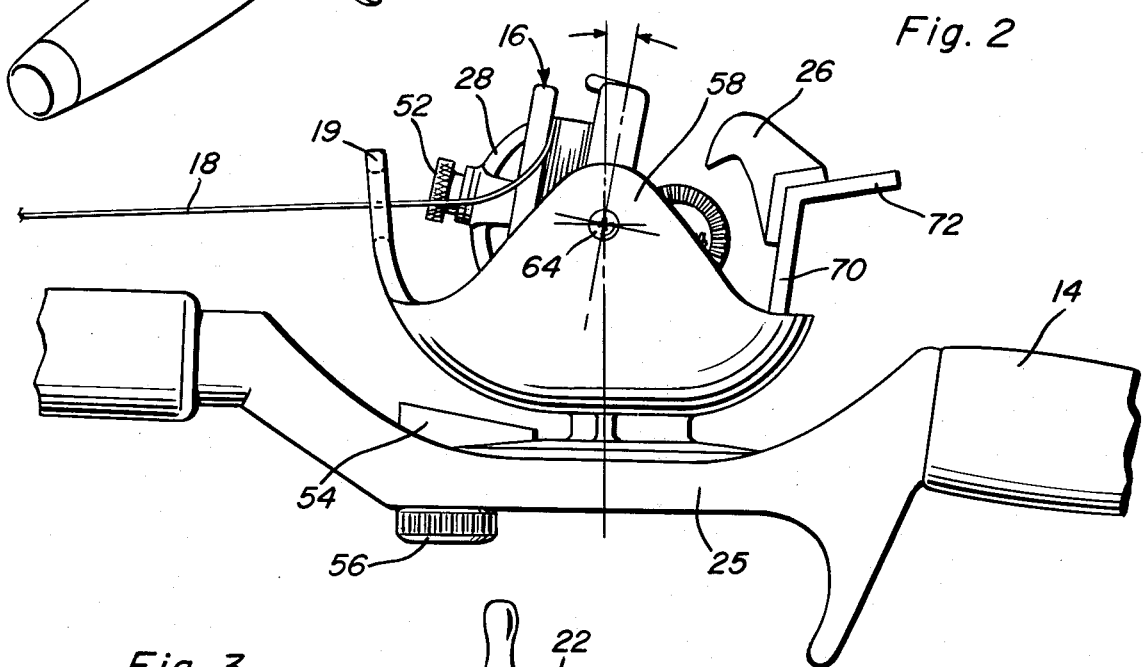
FIG. 2 is a side elevational view of the fishing reel and rod shown in FIG. 1 but with the reel in a position for spin casting operation.
Figure 3:
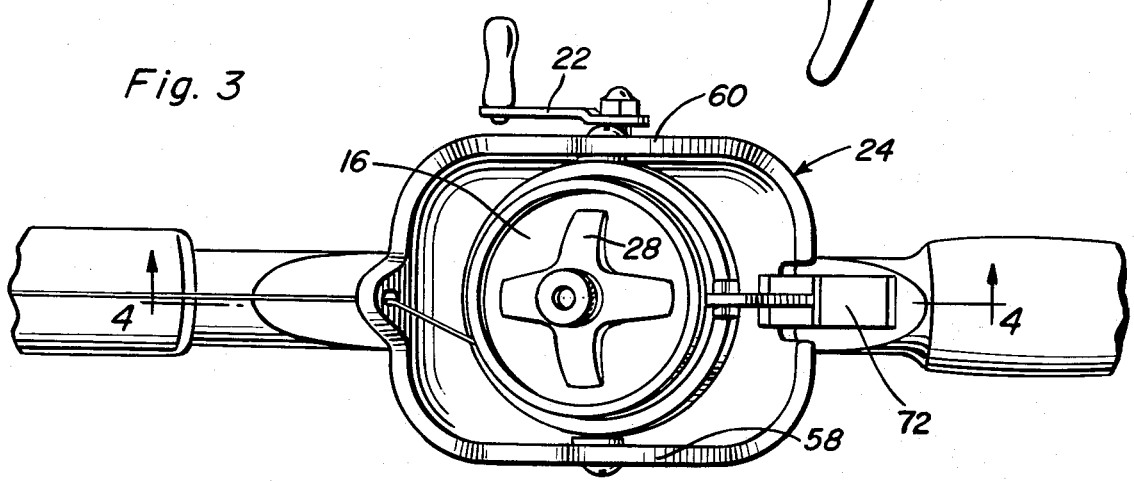
FIG. 3 is a top plan view of the convertible fishing reel shown in FIG. 1.

Referring now, more particularly, to FIGS. 1 and 2 of the drawings, the convertible fishing reel of the present invention is generally indicated by reference numeral 10 and is illustrated as being mounted on a typical fishing rod 12 provided with a handle portion 14. The fishing reel is provided with a line spool 16 for storage of a desired length of fishing line 18 which comes off the spool and is directed through an opening in a guide formation 19 and an eyelet 20, or similar means associated with the fishing rod. The fishing reel is provided with a crank handle 22 to effect manual rotation of the line spool 16 for the purpose of reeling the line in or out, as hereinafter explained.

As mentioned above, the convertible fishing reel of the present invention may be used for either spin casting or reeling operations. As illustrated in FIG. 1, the line spool 16 is positioned for reeling operation, with its axis of rotation lying in a plane generally perpendicular to fishing rod 12 and to the path of line 18 to the first fishing rod eyelet 20. It is apparent from FIG. 1 that when the line spool is in this position, its selected rotation will be effective to reel the line in or out, as desired. As illustrated in FIG. 2, the line spool is in a spin casting position with its axis of rotation lying in a plane at some acute angle to the longitudinal axis of the fishing rod or the direction which line 18 takes to eyelet 20. When the line spool is in this position, the line is free to be payed out in a manner typical of conventional spinning type reels. As the line is payed out, it turns off line spool 16 and comes off its periphery and is guided along the path of line travel. It will be observed that the fishing reel is provided with a latch including a hook member 26 which is mounted on a cup-shaped frame member 24 located 180° from the guide formation 19 relative to an axis extending through a base 23 of the frame member secured to the reel mounting portion 25 of the fishing rod.

Referring now, more particularly, to FIGS. 3-6, the component pieces of a convertible fishing reel of the present invention may be seen in more detail. Preferably, the line spool 16 is rotated by means of a slip clutch arrangement which includes a drive clutch member 28 preferably formed from spring steel and provided with four downwardly turned finger portions, the bottoms of which engage the end wall of line spool 16 as indicated by the reference numeral 30 in FIGS. 4 and 5. The frictional forces at these points of contact are responsible for reeling rotation of the line spool. This determines what is commonly referred to as the "drag" of the fishing line when paying out. Drive clutch member 28 is keyed to the threaded end of a drive shaft 32 for rotation therewith. The drive shaft is rotatably supported in a circular sleeve or collar 34, preferably made of low friction plastic materials and of molded construction integral with a reel support body indicated by reference numeral 36. A bearing disc 38 of low friction material, such as "Teflon," is fitted over a collar 34 and supports line spool 16 for free rotation relative to body 36.

Figure 5:
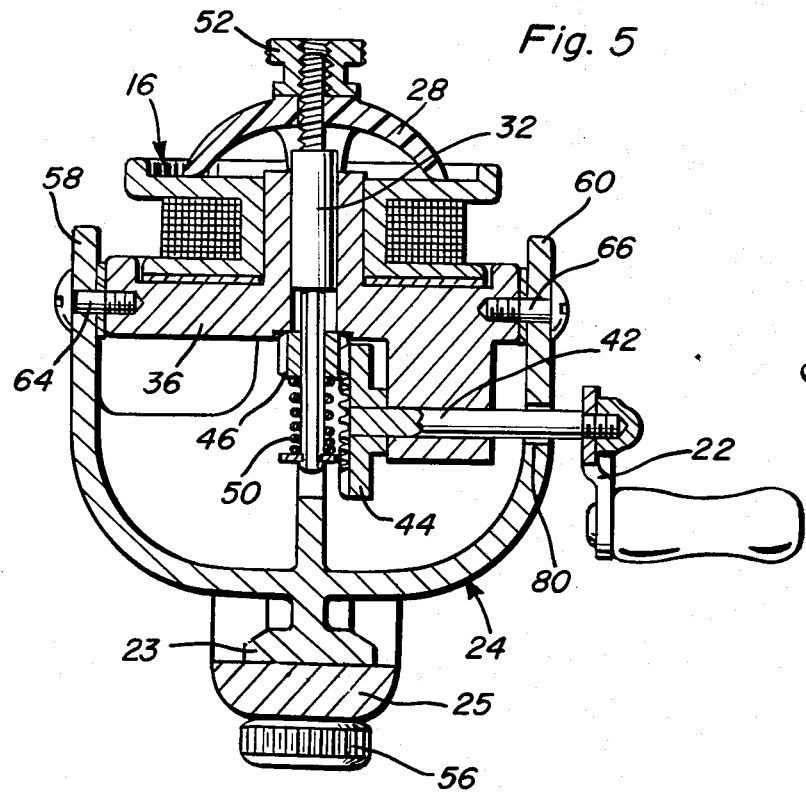
FIG. 5 is a transverse sectional view, taken substantially through a plane indicated by section line 5—5 in FIG. 4.
Figure 6:
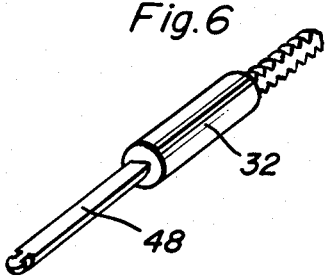
FIG. 6 is a perspective view of the drive shaft associated with the fishing reel of the present invention.

As aforementioned, reeling operation of the line spool 16 is effected by manipulation of crank handle 22. The crank handle is affixed to a drive shaft 42 to effect rotation thereof. Shaft 42 is rotatably supported in a bore extending through a portion of body 36, as best illustrated in FIG. 5. A drive gear 44 affixed to the end of shaft 42 is in meshing engagement with a pinion 46 which is keyed to drive shaft 32 by means of a flat 48, best illustrated in FIG. 6. Pinion 46 is axially movable along a portion of the length of shaft 32 and is biased against body 36 by means of a spring 50. It will be appreciated that the compression spring 50 is transmitted to the points of contact 30 between drive clutch member 28 and line spool 16. A drag adjustment nut 52 is threaded to the end of the drive shaft and is effective to adjust the compression of spring 50 and thus correspondingly adjust the frictional forces at contact points 30 for the drag setting. This provides a convenient means of adjusting the drag setting.

Figure 4:
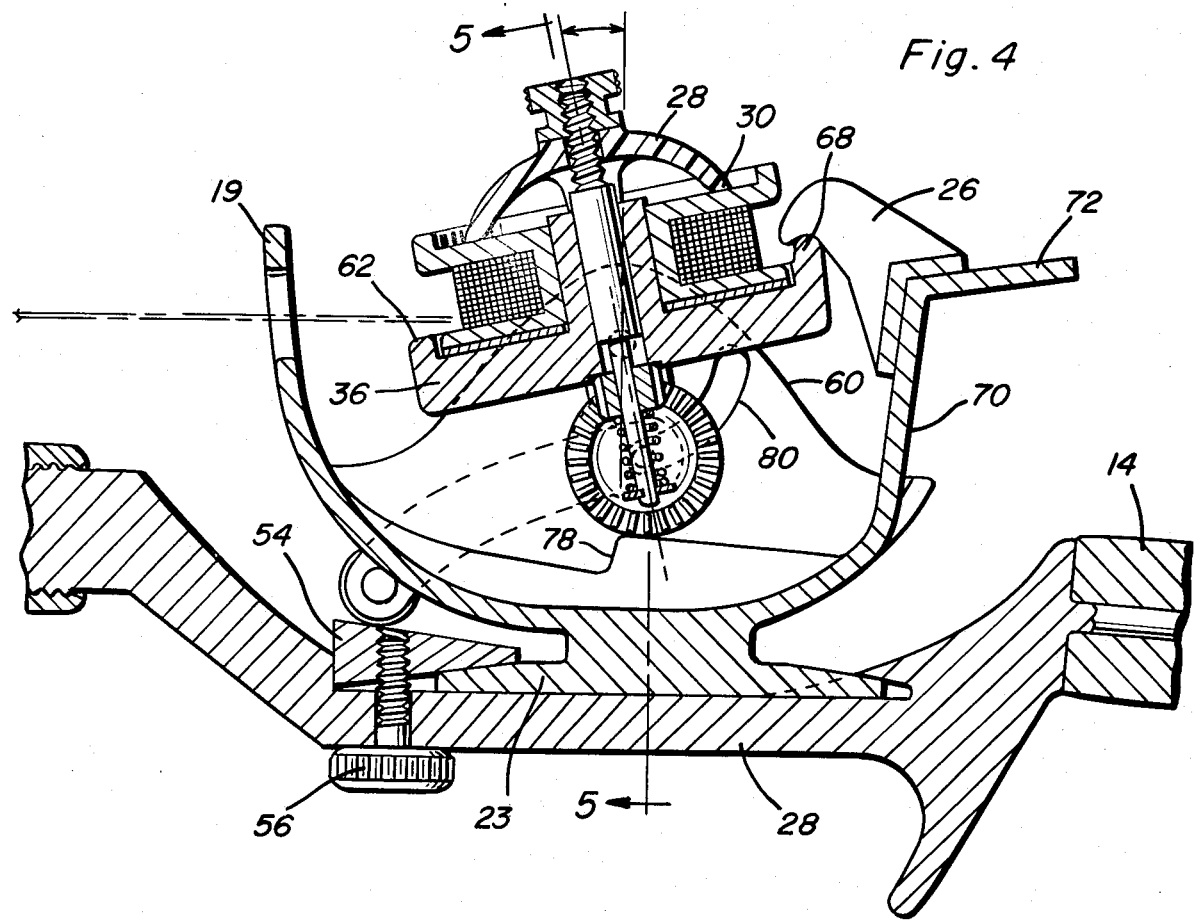
FIG. 4 is a sectional view, taken substantially through a plane indicated by section line 4—4 in FIG. 3.

Referring more particularly to FIG. 4, it will be observed that the frame member 24 is mounted on the portion 25 of a conventional fishing rod by means of its base 23 held in place by a wedge 54 and thumb screw 56, or other convenient fastening means. The frame member 24 includes a pair of parallel spaced side walls 58 and 60 which pivotally support body 36 by means of pivot pins 64 and 66. It will be appreciated that pivotal movement of body 36 and line spool 16 mounted thereon is prevented by means of latch hook 26 which retentively engages an integral rigid projection 68 formed on a rim 62 of body 32 as best illustrated in FIG. 4. Hook 26 is yieldably held in engagement with the projection 68 when the reel 16 is in the reeling position. Leaf spring extension 70 of the frame member mounts the hook 26 on the support frame member 24. Depression of the release tab 72 projecting from the spring 70 is effective to release the body 36 and permit its movement to the spin casting position illustrated in FIG. 2.

The body 36 is biased toward the spin casting position, such that when hook 26 is released, the line spool is automatically flipped from the reeling position to the spinning position. This operation is quick and convenient as the hook release tab 72 is positioned adjacent the gripping handle 14 of the fishing rod for convenient operation by a user's thumb as he begins forward motion of the rod during casting. Not only does this arrangement provide convenient operation, but it also permits the fisherman to accurately time the release to provide the best casting results. It will be appreciated that when the line reel is released for movement to the spin casting position, the bottom surface 74 of body 36 strikes a stop formation 78 in the frame member 24, shown in FIG. 4. This assures that the line spool stops at the proper angular position for spin casting. If it is desired to reel the line in subsequent to a cast, the line spool is merely flipped back to its original reeling position, whereby it is automatically engaged by hook 26 and latched in place without the need for adjustment by the fisherman.

With reference to FIGS. 1 and 4, the drive shaft 42 extends from the body 36 through an angular slot 80 formed in the side wall 60 of the cup-shaped frame member 24. The slot 80 will therefore limit and guide movement of the body 36 with the reel 16 and its drive mechanism carried thereon, between the reeling and spin casting positions. Further, in the reeling position, a limited amount of angular movement of the body 36 and reel 16 is permitted in view of the yieldable mounting of the hook 26 while engaging the body, for automatic line leveling purposes. The angular position of the reel will therefore vary slightly from a limit position, against the bias exerted by the spring 70 through hook 26, to compensate for the axial movement of the reel line relative to the spool 16 during wind or unwind.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. The combination of a fishing rod and a line reeling mechanism mounted thereon having a winding spool displaceable between reeling and spin casting positions, the improvement including a frame fixedly secured to the fishing rod, a support body on which the winding spool is rotatably mounted, a drive mechanism carried by the body and operatively connected to the winding spool, means mounting the body in the frame for movement of the winding spool between said reeling and spin casting positions, latch means engageable with said support body for releasably holding the winding spool in the reeling position, and elastically yieldable means supporting the latch means on the frame for limited line leveling displacement of the winding spool relative to the reeling position against a predetermined bias.

2. The combination of claim 1 including a line guide formation projecting from the frame on a side of the support body opposite the latch means.

3. The combination of claim 1 wherein said latch supporting means includes an elastically deformable extension of the frame exerting said predetermined bias on the frame through the latch means.

4. The combination of claim 1 including a line guide formation projecting from the frame on a side of the support body opposite the latch means.

5. The combination of claim 3 wherein said latch means includes a rigid hook fixedly mounted on the latch supporting means and engageable with a projection fixed to the support body.

6. The combination of claim 1 wherein said latch means includes a rigid hook fixedly mounted on the latch supporting means and engageable with a projection fixed to the support body.

* * * * *